United States Patent
Jung et al.

(10) Patent No.: US 9,420,487 B2
(45) Date of Patent: Aug. 16, 2016

(54) METHOD FOR MEASURING AND REPORTING CSI-RS IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/411,802

(22) PCT Filed: Jul. 1, 2013

(86) PCT No.: PCT/KR2013/005814
§ 371 (c)(1),
(2) Date: Dec. 29, 2014

(87) PCT Pub. No.: WO2014/003508
PCT Pub. Date: Jan. 3, 2014

(65) Prior Publication Data
US 2015/0146561 A1    May 28, 2015

Related U.S. Application Data

(60) Provisional application No. 61/665,909, filed on Jun. 29, 2012, provisional application No. 61/674,265, filed on Jul. 20, 2012, provisional application No. 61/674,401, filed on Jul. 23, 2012.

(51) Int. Cl.
*H04L 12/26*    (2006.01)
*H04W 24/10*    (2009.01)
(Continued)

(52) U.S. Cl.
CPC .............. *H04W 24/10* (2013.01); *H04B 7/024* (2013.01); *H04L 5/0048* (2013.01); *H04L 5/0094* (2013.01); *H04W 24/08* (2013.01); *H04W 52/146* (2013.01); *H04L 5/0035* (2013.01)

(58) Field of Classification Search
CPC ........ H04B 7/024; H04B 7/0632; H04B 7/04; H04B 7/26; H04J 11/00; H04W 24/10; H04L 5/0057
USPC .......................................... 370/328–329, 332
See application file for complete search history.

(56) References Cited

U.S. PATENT DOCUMENTS

2003/0003880 A1 * 1/2003 Ling .................... H04B 7/0417
                                                                  455/92
2010/0190488 A1 * 7/2010 Jung ..................... H04W 24/10
                                                                  455/424
(Continued)

FOREIGN PATENT DOCUMENTS

JP    WO 2012124552 A1 * 9/2012 ............ H04W 24/10
KR    10-2012-0049134 A    5/2012
(Continued)

OTHER PUBLICATIONS

Nokia Siemens Networks, Nokia Corporation "CSI-RS based channel quality measurement", 3GPP TSG-RAN WG1 Meeting #69, R1-122412, Prague Czech Republic, May 21-25, 2012.

*Primary Examiner* — Khaled Kassim
*Assistant Examiner* — Berhanu Belete
(74) *Attorney, Agent, or Firm* — Birch, Stewart, Kolasch & Birch, LLP

(57) ABSTRACT

Provided is a method for measuring and reporting a channel state information-reference signal (CSI-RS) by a terminal in a wireless communication system. The method involves acquiring, from a network, a measurement configuration for measuring radio resource monitoring, the measurement configuration including information for requesting a CSI-RS measurement report, performing a CSI-RS measurement based on the measurement configuration in order to acquire a CSI-RS measurement result, evaluating whether or not a measurement result report condition has been satisfied based on the measurement configuration, and, if the measurement result report condition has been satisfied, transmitting a measurement report message to the network. The measurement report message includes the CSI-RS measurement result.

11 Claims, 18 Drawing Sheets

(51) Int. Cl.
*H04L 5/00* (2006.01)
*H04W 24/08* (2009.01)
*H04B 7/02* (2006.01)
*H04W 52/14* (2009.01)

(56) References Cited

U.S. PATENT DOCUMENTS

| | | | | |
|---|---|---|---|---|
| 2011/0170496 A1* | 7/2011 | Fong | H04L 5/0053 | 370/329 |
| 2011/0199986 A1* | 8/2011 | Fong | H04L 5/0035 | 370/329 |
| 2011/0244877 A1* | 10/2011 | Farajidana | H04L 5/0023 | 455/452.2 |
| 2012/0088458 A1* | 4/2012 | Nogami | H04B 7/0632 | 455/67.11 |
| 2012/0147773 A1* | 6/2012 | Kim | H04L 1/0025 | 370/252 |
| 2012/0155312 A1* | 6/2012 | Kim | H04W 24/10 | 370/252 |
| 2012/0176939 A1* | 7/2012 | Qu | H04L 5/0023 | 370/255 |
| 2012/0176982 A1* | 7/2012 | Zirwas | H04B 7/024 | 370/329 |
| 2012/0201163 A1* | 8/2012 | Jongren | H04W 24/10 | 370/252 |
| 2013/0003788 A1* | 1/2013 | Marinier | H04B 7/024 | 375/219 |
| 2013/0028109 A1* | 1/2013 | Jongren | H04W 24/10 | 370/252 |
| 2013/0028182 A1* | 1/2013 | Geirhofer | H04L 5/0048 | 370/328 |
| 2013/0077513 A1* | 3/2013 | Ng | H04B 7/024 | 370/252 |
| 2013/0114431 A1* | 5/2013 | Koivisto | H04B 7/024 | 370/252 |
| 2013/0148515 A1* | 6/2013 | Ribeiro | H04L 5/0094 | 370/252 |
| 2013/0260741 A1* | 10/2013 | Yamada | H04W 24/00 | 455/422.1 |
| 2013/0279343 A1* | 10/2013 | Jeong | H04W 24/10 | 370/241 |
| 2013/0286997 A1* | 10/2013 | Davydov | H04B 7/024 | 370/329 |
| 2013/0294271 A1* | 11/2013 | Nagata | H04W 24/10 | 370/252 |
| 2013/0301542 A1* | 11/2013 | Krishnamurthy | H04W 52/50 | 370/329 |
| 2013/0344868 A1* | 12/2013 | Yamada | H04B 7/024 | 455/436 |
| 2014/0177601 A1* | 6/2014 | Nishio | H04W 24/10 | 370/332 |
| 2014/0226582 A1* | 8/2014 | Zeng | H04B 7/0626 | 370/329 |
| 2014/0308905 A1* | 10/2014 | Miao | H04L 5/0023 | 455/67.11 |

FOREIGN PATENT DOCUMENTS

| | | |
|---|---|---|
| WO | WO 2010/143911 A2 | 12/2010 |
| WO | WO 2012/061765 A1 | 5/2012 |

* cited by examiner

METHOD FOR MEASURING AND REPORTING CSI-RS IN WIRELESS COMMUNICATION SYSTEM, AND APPARATUS FOR SUPPORTING SAME

CROSS REFERENCE TO RELATED APPLICATIONS

This application is the National Phase of PCT/KR2013/005814 filed on Jul. 01, 2013, which claims priority under 35 U.S.C. 119(e) to U.S. Provisional Application Nos. 61/665,909 filed on Jun. 29, 2012; 61/674,265 filed on Jul. 20, 2012, and 61/674,401 filed on Jul. 23, 2012, all of which are hereby expressly incorporated by reference into the present application.

BACKGROUND OF THE INVENTION

1. Field of the Invention

The present invention relates to wireless communication and, more particularly, to a method for measuring and reporting CSI-RS in a wireless communication system and an apparatus for supporting the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In recent years, with the supply of smart phones, a request of a user wanting to receive a data service having a high level of quality regardless of time and location has been increased. Accordingly, there is a need capable of supporting high data rate to terminals located at an outer peripheral portion of a cell as well as a center of the cell. The center of the cell may increase a data transmission rate by supporting an additional antenna port by cells. However, since the outer peripheral portion of the cell may be significantly interfered with a peripheral cell, it may be difficult to increase the data rate greater than a certain limit without cooperation between cells. Further, in order for a user to provide a data service having a high rate in a dense zone, a reuse technology of a frequency through a small cell such as a Pico cell or a Femto cell in a zone of a Macro cell is supplied so that a requirement of a method of efficiently interference between transmission points has been increased.

A 3GPP provides a Coordinated Multi-Point transmission and reception (CoMP) scheme as a method of controlling the above interference. According to the CoMP, since the terminal simultaneously receives data through a Transmission Point (TP) such as a plurality of base stations or a plurality of antennas or receives the data from the best TP, a better service may be provided to the terminal. In order to provide the better service through the CoMP, uplink and downlink reference signals, channel state information of the terminal, a control channel structure, and a method of controlling uplink power have been continuously discussed.

SUMMARY OF THE INVENTION

The present invention provides a method for measuring and reporting CSI-RS in a wireless communication system and an apparatus for supporting the same.

In an aspect, a method for measuring and reporting a channel state information-reference signal (CSI-RS) by a terminal in a wireless communication system is provided. The method comprises acquiring, from a network, a measurement configuration for measuring radio resource monitoring (RRM), the measurement configuration including information for requesting a CSI-RS measurement report; performing a CSI-RS measurement based on the measurement configuration in order to acquire a CSI-RS measurement result; evaluating whether or not a measurement result report condition has been satisfied based on the measurement configuration; and if the measurement result report condition has been satisfied, transmitting a measurement report message to the network, wherein the measurement report message includes the CSI-RS measurement result.

The measurement configuration may comprise a report configuration to specify a measurement result report reference, and the information for requesting the CSI-RS measurement report is included in the report configuration.

The method may further comprise acquiring an RRM measurement result by measuring the RRM, wherein the evaluating whether or not a measurement result report condition has been satisfied comprises: determining whether the RRM measurement result satisfies the measurement result report reference specified by the report configuration; and determining that the measurement result report condition is satisfied when the measurement result report reference is satisfied, wherein the measurement report message comprises the RRM measurement result and the CSI-RS measurement result.

The evaluating whether or not a measurement result report condition has been satisfied may comprise determining whether the CSI-RS measurement result satisfies the measurement result report reference specified by the report configuration; and determining that the measurement result report condition has been satisfied when the measurement result report reference is satisfied.

The method may further comprise acquiring an RRM measurement result by performing the RRM measurement with respect to a serving cell, wherein the measurement report message further comprises the RRM measurement result.

The information for requesting the CSI-RS measurement report may comprise an identity to identify at least one CSI-RS resource.

The evaluating whether or not a measurement result report condition has been satisfied may comprise determining that the measurement result report condition has been satisfied when the CSI-RS measurement result corresponds to at least one CSI-RS resource identified by the identity of the report configuration and the CSI-RS measurement result satisfies the measurement result report reference specified by the report configuration.

The method may further comprise acquiring an RRM measurement result by performing the RRM measurement with respect to a serving cell, wherein the measurement report message further comprises the RRM measurement result.

The measurement report message may further comprise a CSI-RS ID to identify a CSI-RS resource with respect to the CSI-RS measurement result.

The CSI-RS measurement result and the CSI-RS resource may be forwarded to a target cell when the terminal handovers.

In another aspect, a wireless apparatus operating in a wireless communication system is provided. The wireless apparatus comprises a Radio Frequency (RF) unit that sends and receives radio signals; and a processor that is functionally coupled to the RF unit and operates, wherein the processor is configured to: acquire, from a network, a measurement configuration for measuring radio resource monitoring (RRM), the measurement configuration including information for requesting a CSI-RS measurement report; perform a CSI-RS measurement based on the measurement configuration in order to acquire a CSI-RS measurement result; evaluate whether or not a measurement result report condition has been satisfied based on the measurement configuration; and transmit a measurement report message to the network if the measurement result report condition has been satisfied, wherein the measurement report message includes the CSI-RS measurement result.

An embodiment of the present invention provides a method for configuring CSI-RS measurement/report. The network configures the CSI-RS measurement/report to be combined with RRM measurement and report. Further, the present invention provides a method which enables the network to configure the CSI-RS measurement and report to be triggered independently from the RRM measurement while configuring the CSI-RS measurement/report to be combined with the RRM measurement configuration. Further, the present invention configures the CSI-RS measurement/report associated with a set of a specific CSI-RS resource and/or a specific CSI-RS resource. In this way, the present invention may more efficiently acquire a CSI-RS measurement result measured by a terminal by combining the CSI-RS measurement report with the RRM measurement/report procedure. This may provide a coordinated communication service having excellent quality to the terminal.

In addition, the present invention provides a scheme of forwarding a CSI-RS measurement configuration, a CSI-RS resource and/or a CSI-RS measurement result configured in the terminal to a target cell during a handover procedure. The target cell may configure the CSI-RS optimized in the terminal based on forwarded information. Accordingly, the terminal may receive a coordinated communication service having more improved quality.

DESCRIPTION OF EXEMPLARY EMBODIMENTS

Figure 1:
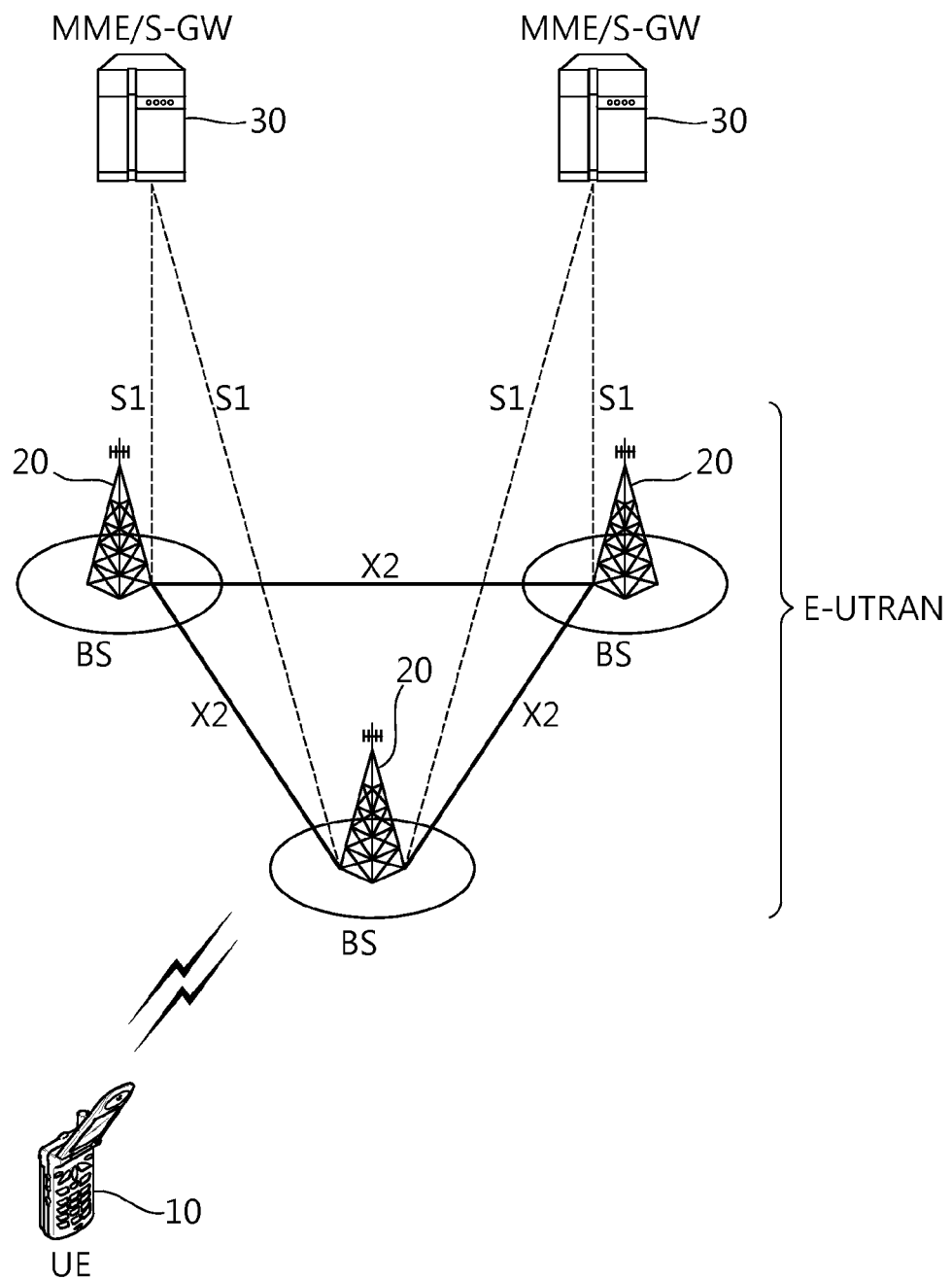
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
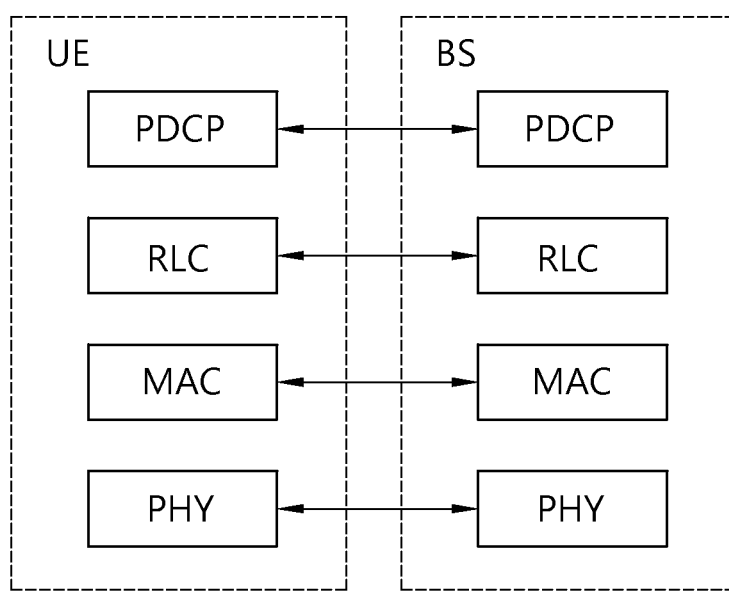
FIG. 2 is a block diagram showing the structure of a wireless protocol on the user plane.
Figure 3:
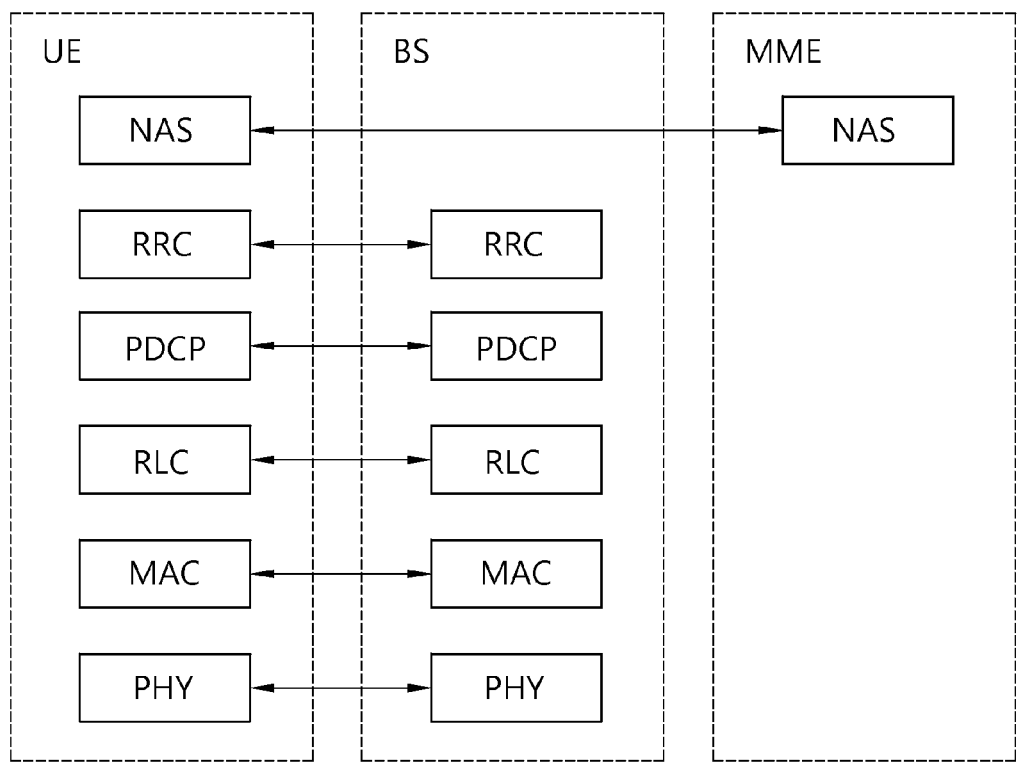
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
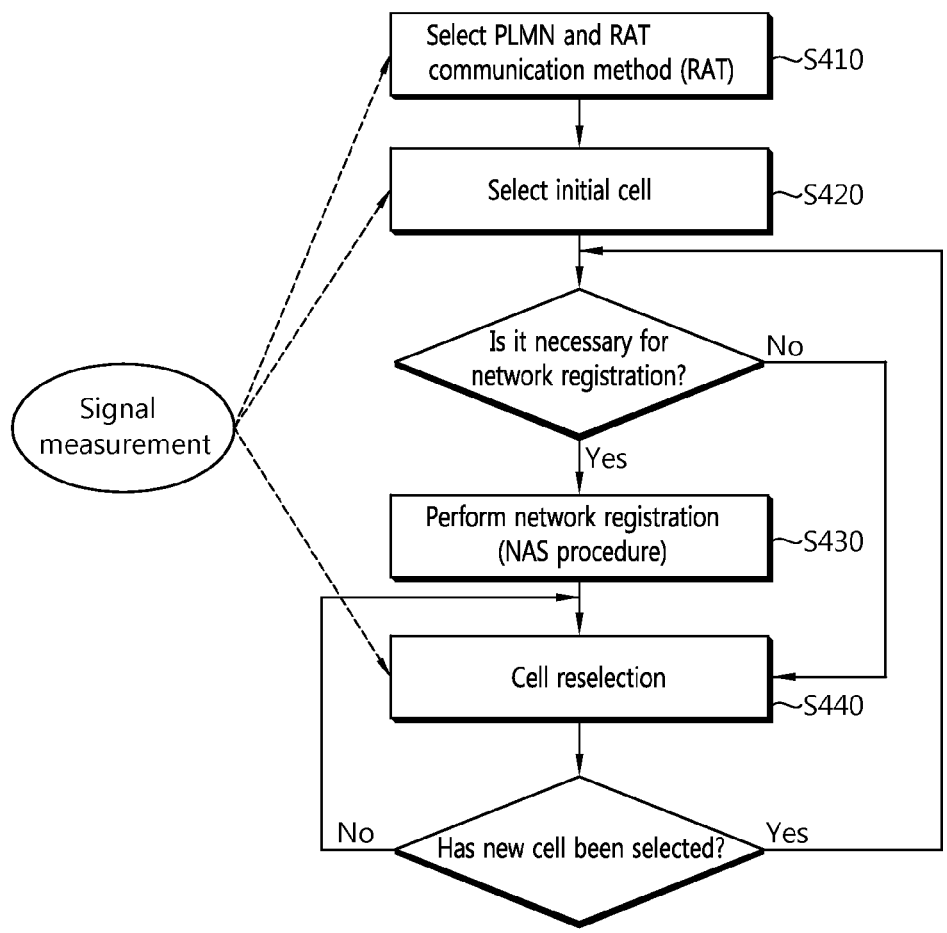
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
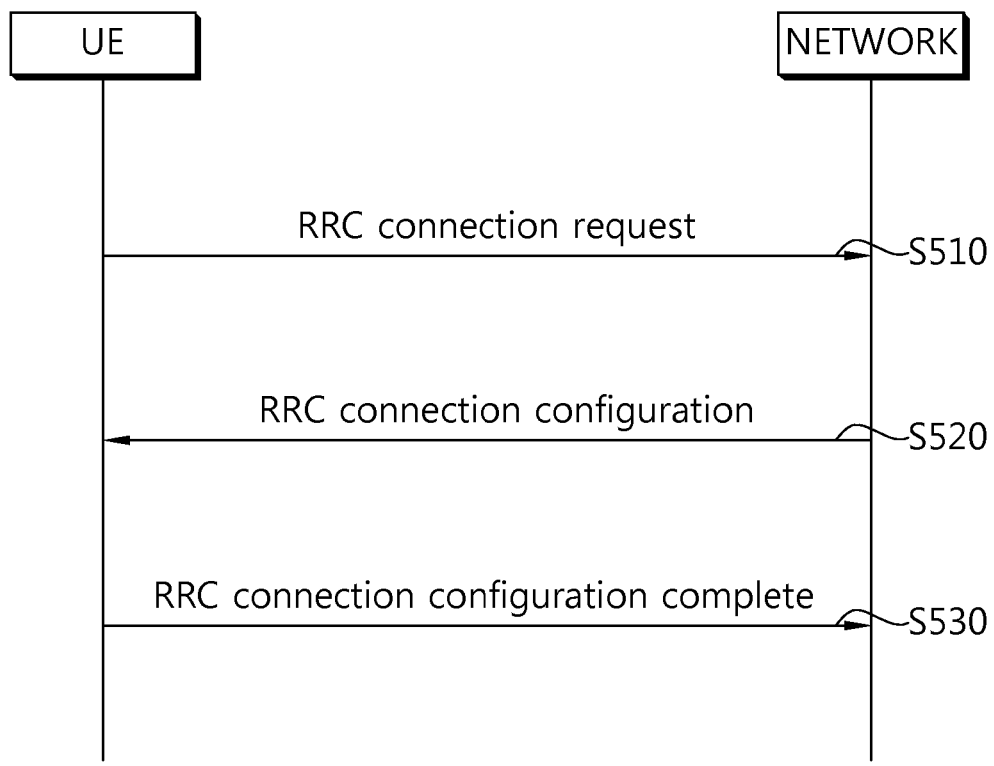
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
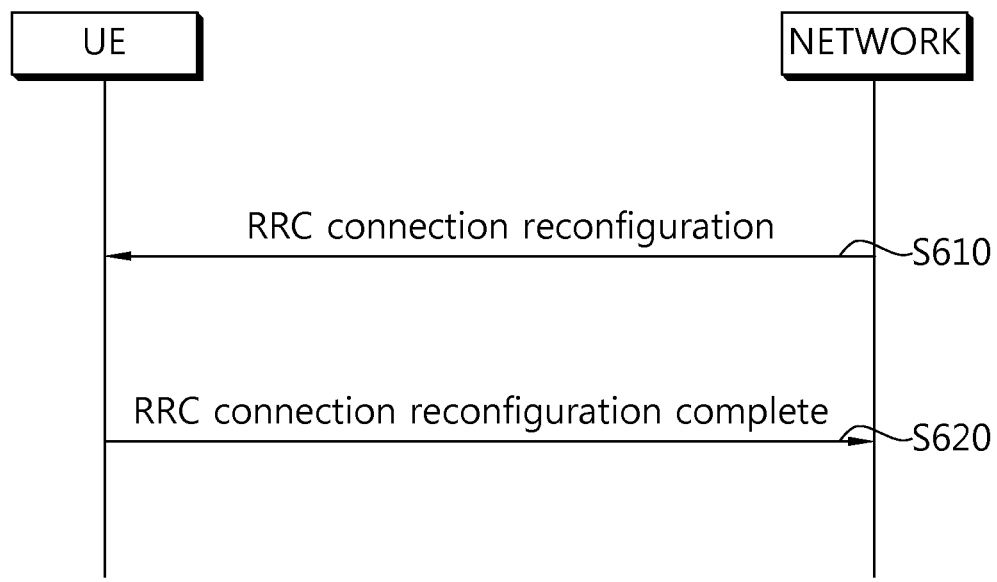
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset-Qoffsets, n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE
  A case where uplink transmission is problematic because a random access procedure continues to fail in the MAC sublayer.
  A case where uplink transmission is problematic because uplink data transmission continues to fail in the RLC sublayer.
  A case where handover is determined to have failed.
  A case where a message received by UE does not pass through an integrity check.

An RRC connection re-establishment procedure is described in more detail below.

Figure 7:
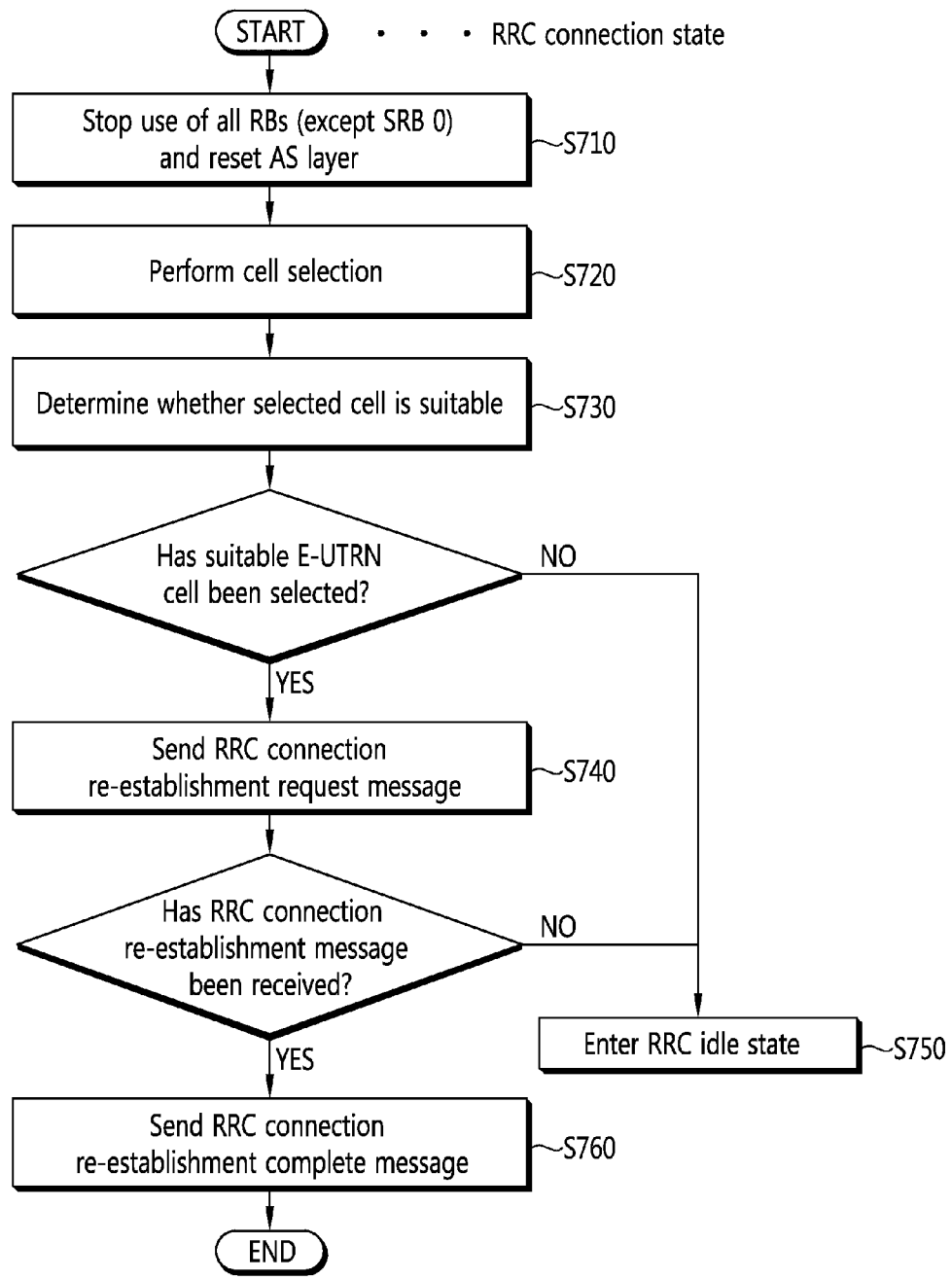
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
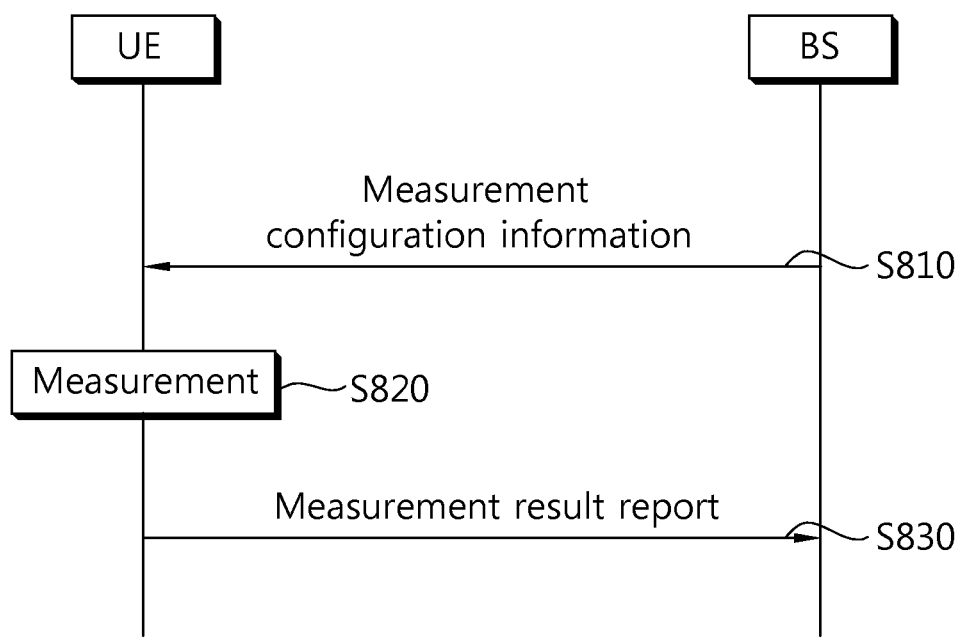
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy report conditions within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different form that of a serving cell, and the inter-RAT measurement object may indicate a neighboring cell having RAT different from that of a serving cell.

(2) Reporting configuration information: this is information about report conditions regarding when UE reports measured results and a report type. The report conditions may include information about an event or cycle on which the report of the measured results is triggered. The report type is information regarding that the measured results will be configured in what type.

(3) Measurement identity information: is information on a measurement identity when the terminal reports a certain object to be measured in a certain type by associating an object to be measured with a report setting. The measurement identity information is included in a measurement report message so that a measurement result is related to a certain object to be measured, and may indicate that a measurement report is generated as a certain report condition.

(4) Quantity configuration information: represents information on a parameter for setting filtering of a measurement unit, report unit and/or measurement result value.

(5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement procedure, UE has a measurement object list, a measurement report configuration list, and a measurement identity list.

In 3GPP LTE, a BS may configure only one measurement object for a single frequency band in relation to UE. In accordance with Paragraph 5.5.4 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Report Conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
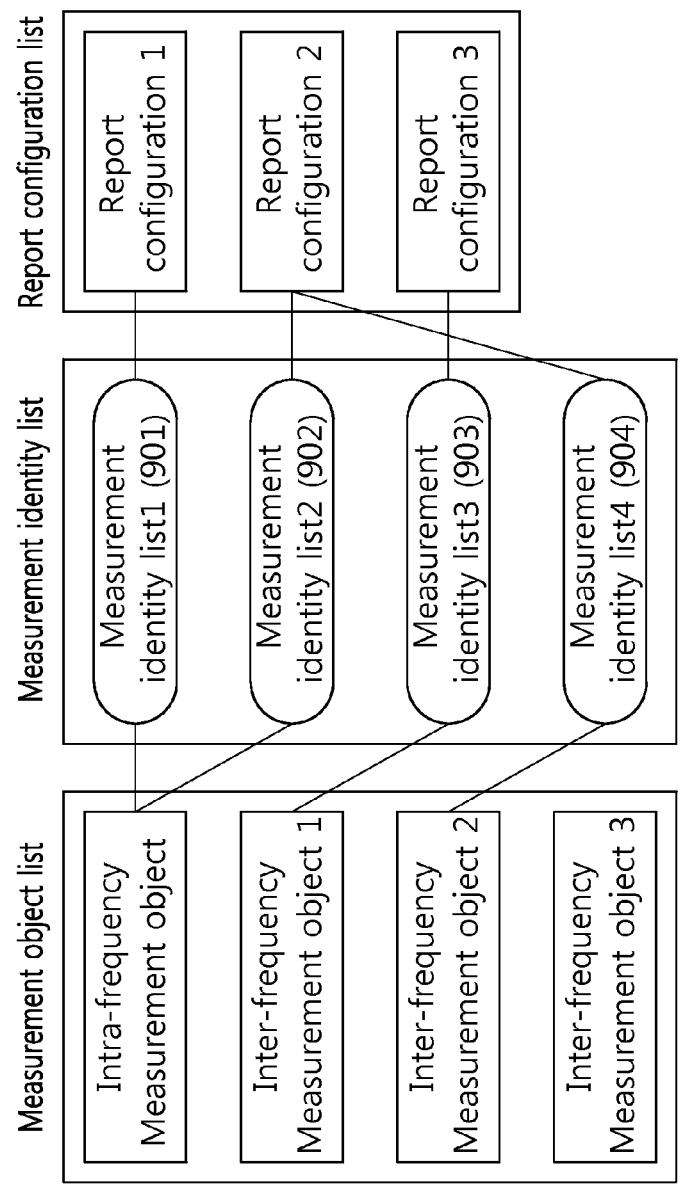
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
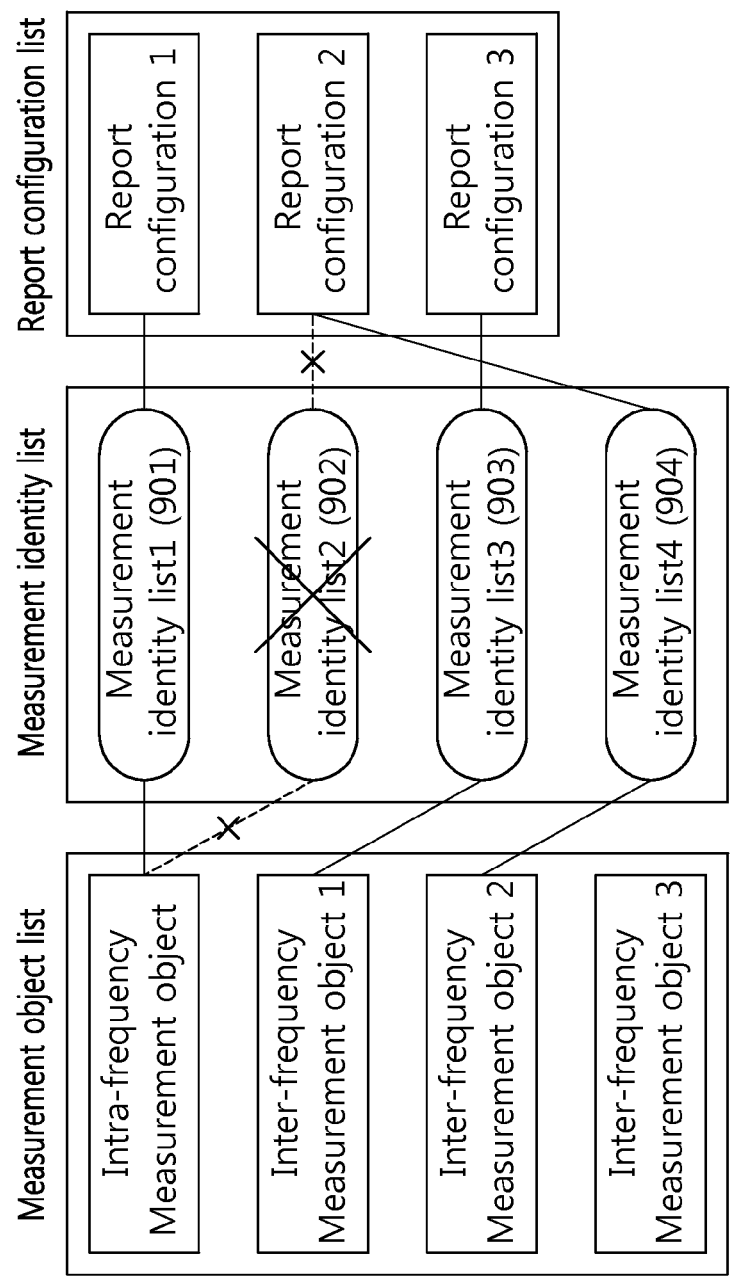
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
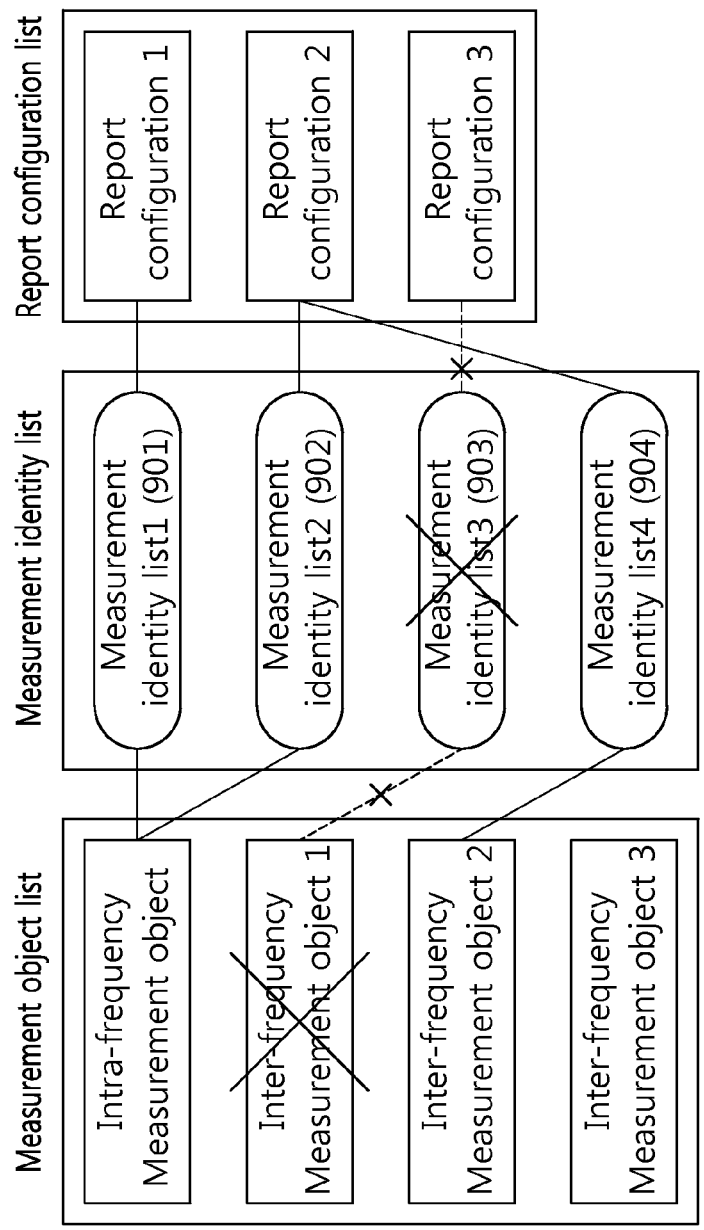
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

A current wireless communication system uses various reference signals in order to provide information on a communication environment to a counterpart device through uplink or downlink.

As one of reference signals, a Cell specific Reference Signal (CRS) is transmitted for each sub-frame in order to recognize channel information upon transmission of downlink. In this case, different temporal/frequency domains are allocated and transmitted to four antennas according to 4 which is the number of maximum antenna ports supported from downlink of a wireless communication system. In an existing wireless communication system, Channel State Information (CSI) is acquired for channel estimation or the CRS may be used for Radio Resource Monitoring (RRM) measurement and demodulation.

Meanwhile, a recent wireless communication system supports a downlink transmission scheme through maximum 8 antennas. Accordingly, the above transmission scheme may not be supported by the CRS defined with respect to four antennas. In addition, in a measurement side based on the CRS, transmission of the CRS every sub-frame may lower a wireless resource use efficiency due to overhead.

In order to compensate for the above problem, a Channel State Information Reference Signal (CSI-RS) is introduced as a reference signal to acquire channel state information. The terminal may acquire channel state information through channel estimation by performing measurement based on the CSI-RS. The existing CRS may be implemented to be used for measuring an RRM by introducing the CSI-RS. Further, a Demodulation Reference Signal (DM-RS) may be separately provided for demodulation.

Hereinafter, Coordinated Multi-Point transmission and reception (CoMP) will be described.

In a cellular network, since interference from a neighbor cell is low, a cell center zone may support an additional antenna port regardless of transmission of the neighbor cell or may increase a data transmission rate through carrier aggregation.

Meanwhile, since an outer peripheral portion of the cell may be significantly interfered with a neighbor cell, it may be difficult to transmit data through increase of the antennas or carrier aggregation. The CoMP is suggested to minimize mutual interference when peripheral cells of the terminal perform coordinated communication and provide a better service by improving a data transmission rate in an environment such as an outer peripheral portion of the cell where interference may be significantly operated. The CoMP is a technology which is applicable to a situation where a macro cell and a pico cell or a Femto cell coexist as well as an interference environment between macro cells.

Figure 12:
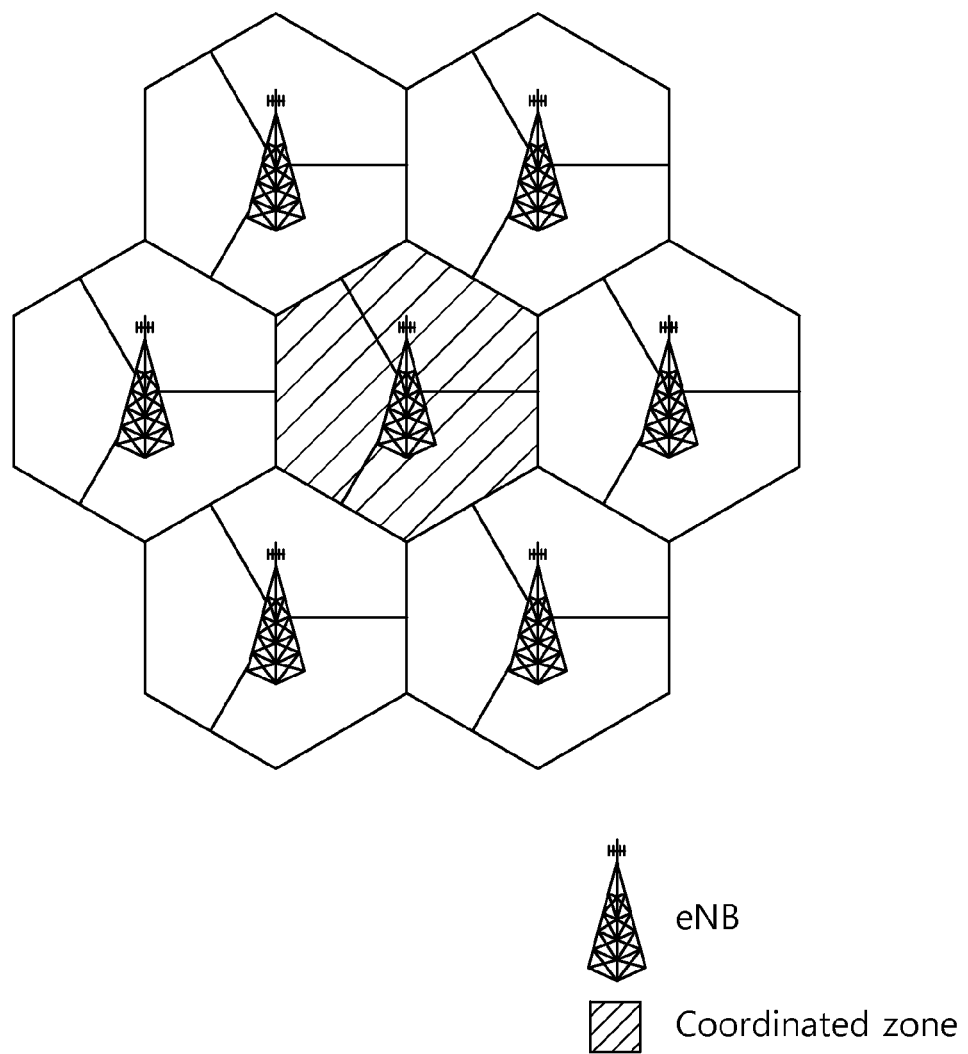
FIGS. 12 to 14 illustrate scenarios with application of the CoMP.
Figure 14:
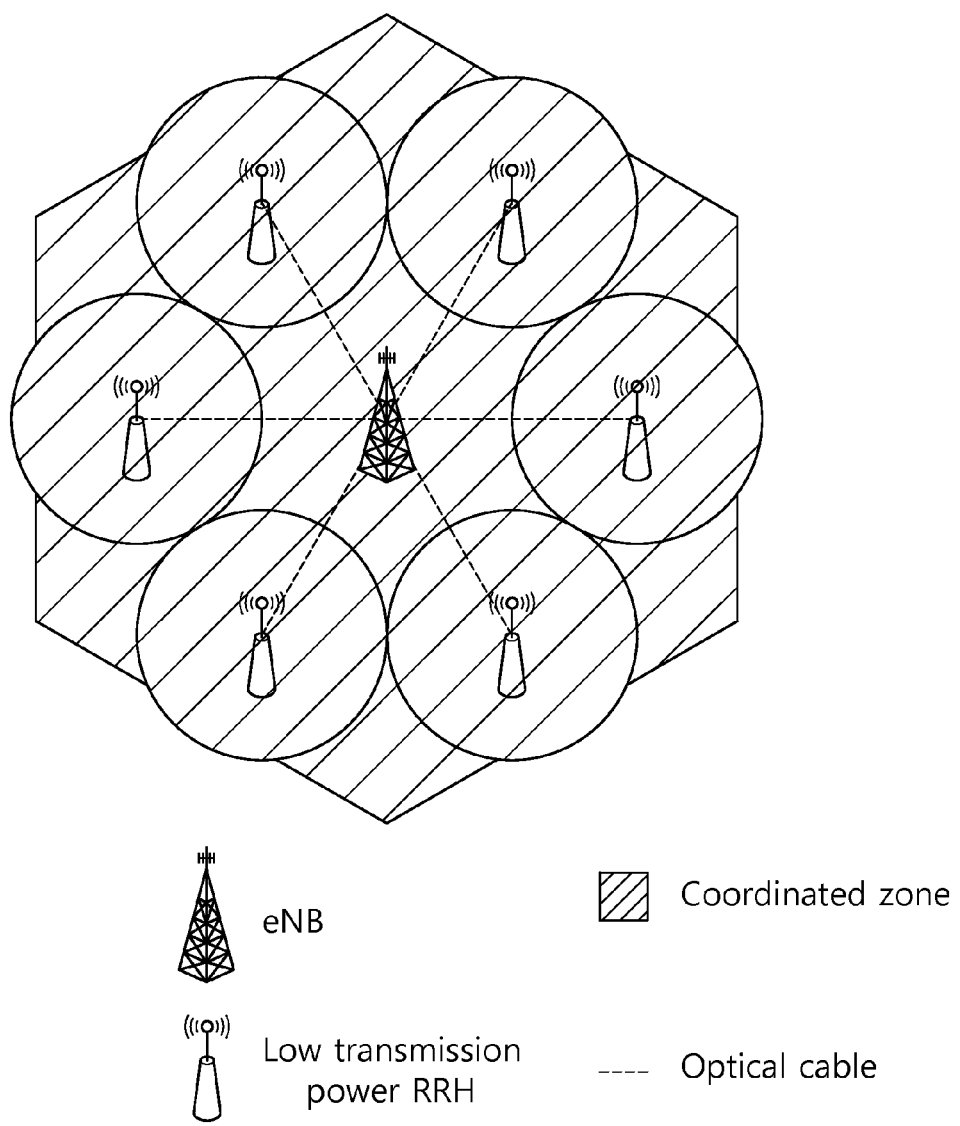

A scenario with application of the CoMP may be illustrated in FIGS. 12 and 14.

A first scenario shown in FIG. 12 indicates a case where coordinated communication between sectors in one base station is achieved (Homogeneous network with intra-site CoMP).

Figure 13:
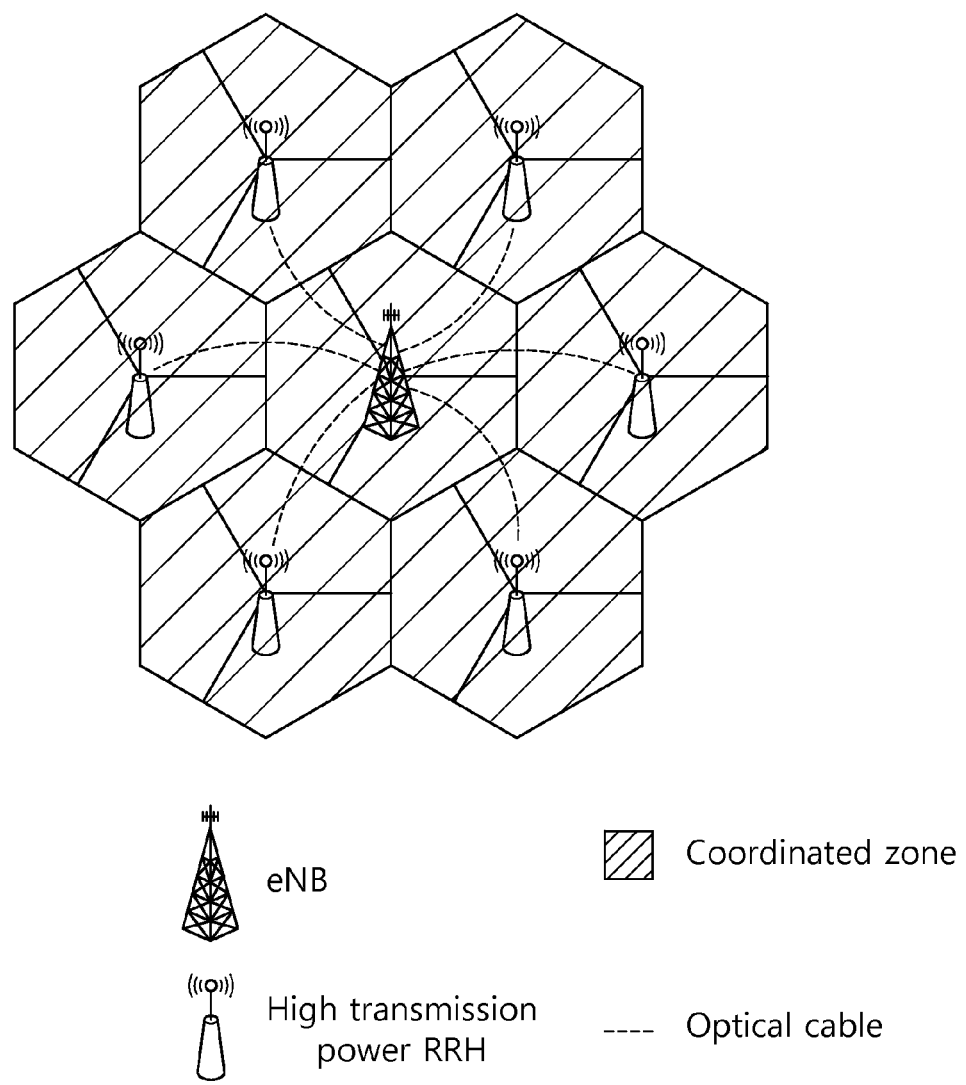

A second scenario shown in FIG. 13 indicates a case where coordinated communication is achieved between base stations in an environment in which an optical cable is located between base stations (Homogeneous network with high Tx power Remote Radio Heads (RRHs)).

Third and fourth scenarios shown in FIG. 14 assume a heterogeneous network environment where Transmission Points (TPs) having different transmission powers exit. That is, the coordinated communication is achieved between low power radio heads and high power radio heads arranged in a macro cell zone.

The third scenario is a case where the low power radio head has a cell ID. That is, the third scenario considers coordinated transmission between the macro cell and a pico cell in a heterogeneous network.

The third scenario indicates a case where low power radio heads have the same cell ID as that of the macro cell. That is, the fourth scenario considers a Distributed Antenna System (DAS) which is coordinated transmission between radio heads spreading at a full region of the macro cell.

When the CoMP is applied, following schemes are considered in a coordinated scheme between TPs.

Coordinated scheduling: Mutual coordinated TPs minimize interference by suitably adjusting temporal or frequency resources transmitting a signal and increase a quality of a signal received by the terminal.

Coordinated beamforming: Mutual coordinated TPs minimize interference in another TP by suitably adjusting a direction of a beam formed for transmitting a signal and increase a quality of a signal received by the terminal.

Joint processing: Mutual coordinated TPs simultaneously transmit a signal to one terminal or dynamically selects an optimal TP considering a channel situation of the terminal to transmit the signal to the terminal.

When base station coordinated communication is used, a serving terminal sets a Channel State Information-Reference Signal (CSI-RS) resource of each TP in the terminal so that the terminal may measure a channel state between another TP and the terminal except for the serving cell. The terminal measures a CSI-RS resource of each TP, and acquires information on a channel state with respect to a corresponding TP. The terminal measures a CSI-RS resource to acquire CSI-RS resource results and reports the acquired CSI-RS resource results to the serving cell. The serving cell may share the CSI-RS measurement results acquired from the terminal with a peripheral TP associated with coordinated communication.

The terminal may be configured to perform measurement and report together with configuration of a suitable CoMP measurement set in order to support an operation of an E-UTRAN. Hereinafter, the above CoMP measurement set may refer to a CoMP set. In particular, the terminal may be configured to measure the CSI-RSRP with a set of a CSI-RS resource to report the measured CSI-RSRP. The set of the CSI-RS resource may refer to a CoMP resource management (CRM) set. The measurement and report of the CRM set may be independent from present mobility measurement and procedure.

The terminal explicitly measures the CSI-RS resource by the E-UTRAN associated with the CSI-RS resource for the CRM set, and receives a request of the report of a result thereof. The CSI-RS resources in the CRM set may be configured independently from those of the CoMP measurement set. The CRM set may be configured as a part of the measurement set.

The terminal provides a CSI-RSRP measurement result associated with the measurement report of the CRM set. At least one event triggered report is supported. An event to trigger a report of the measurement result may satisfy an absolute reference (that is, a case where quality of the measurement result is greater than a threshold value) or satisfy a relative reference (comparison with a measurement result with respect to other CSI-RS resource, for example, a case where a specific number of measurement results having a high level of quality among the measurement results are acquired).

A systemically method for setting the CSI-RS measurement to report may be suggested in order to efficiently measure and report the CSI-RS resource by the terminal. A method for measuring and reporting the CSI-RS is suggested based on a measurement configuration structure so that a measurement configuration introduced to measure and report an existing RRM is efficiently applied to the CSI-RS measurement and report.

Figure 15:
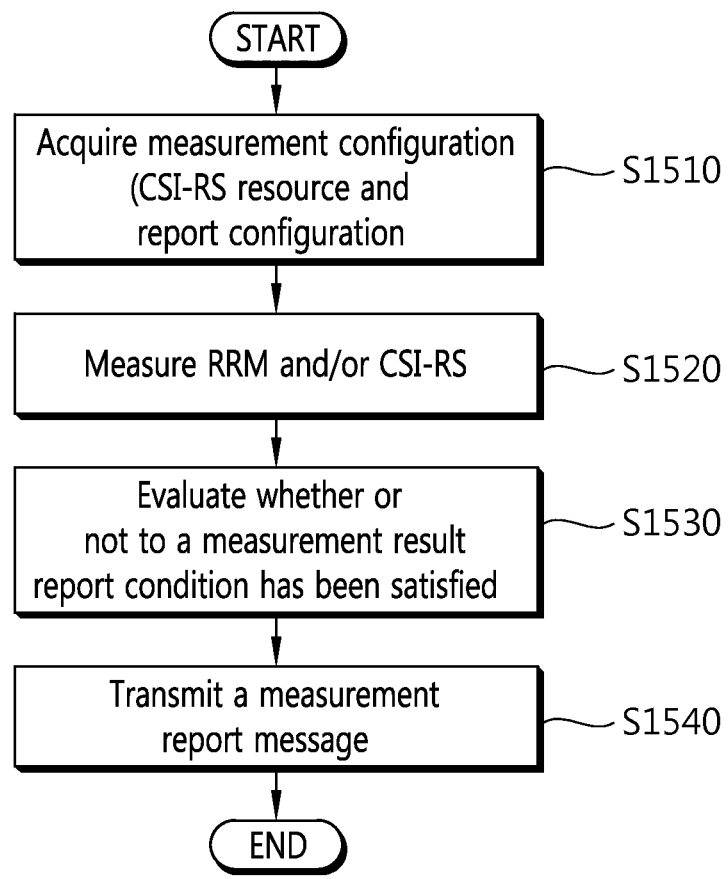
FIG. 15 is a flowchart illustrating a method for measuring and reporting a CSI-RS according to an embodiment of the present invention.

FIG. 15 is a flowchart illustrating a method for measuring and reporting a CSI-RS according to an embodiment of the present invention.

Referring to FIG. 15, a terminal acquires a CSI-RS measurement configuration from a network (S1510). The measurement configuration obtained by acquisition of the terminal may be performed through a measurement configuration message for RRM measurement and report. The network may request performing of the CSI-RS measurement report of the terminal by adding information to request the CSI-RS measurement report in the measurement configuration. The network may allocate the CSI-RS resource to a corresponding terminal by adding the CSI-RS resource for CSI-RS measurement to the measurement configuration.

When the network requests to include the CSI-RS measurement result, the network may limit the maximum number of CSI-RS resources to be reported. That is, the network may include information indicating the maximum number of CSI-RS resources in a transmitted message upon request.

The terminal measures an RRM and/or a CSI-RS (S1520). The CSI-RS measurement performed by the terminal may be measurement with respect to CSI-RS resources allocated to the terminal. Accordingly, the terminal may acquire RRM measurement results with respect to a serving cell and/or a neighbor cell and a measurement result with respect to CSI-RS resource of at least one transmission point.

The terminal evaluates whether or not a measurement report condition has been satisfied (S1530). The terminal evaluates whether or not a measurement report condition has been satisfied based on a report reference specified by a report configuration of the measurement configuration. The terminal evaluates whether the RRM measurement result and/or a measurement result with respect to the CSI-RS resource satisfy the configured report reference. Accordingly, the terminal may determine whether to transmit a measurement report message. Evaluation whether to satisfy a report condition by the terminal may be differently performed according to detailed contents of a measurement configuration achieved by the terminal. Meanwhile, when information indicating the maximum number of CSI-RS resources to be reported in the measurement configuration is included, the terminal may determine to report an indicated number of CSI-RS measurement results having a high level of measurement result quality.

The terminal may evaluate whether or not the measurement report condition has been satisfied by applying a hysteresis value and/or an offset value.

When an entering condition and/or a leaving condition is applied, the hysteresis value may be introduced.

The hysteresis value may be implemented to be applied to only the leaving condition. The above may be applied to a specific/designated report event by the network or may be applied to a previously configured specific/designated report event by the terminal.

Alternatively, the hysteresis value may be set to a different value to be applied to the entering condition and/or the leaving condition. For example, the hysteresis value with respect to the leaving condition may be greater than a hysteresis value with respect to the entering condition.

Alternatively, offset values with respect to the entering condition and the leaving condition may be applied, respectively.

When the measurement report condition has been satisfied, the terminal transmits a measurement report message to the network (S1540). In this case, the measurement report message may include a measurement report message transmitted when a report condition according to the RRM measurement result is satisfied. The measurement report message may include the RRM measurement result and/or the CSI-RS measurement result. A CSI-RS ID to identify a CSI-RS resource associated with the CSI-RS measurement result may be included in the measurement report message.

An operation of the terminal according to a measurement/report request from the network may be performed in the form of a measurement report based on an event. That is, only when a report configuration of the event includes a request indicator requesting the above CSI-RS measurement and report, the CSI-RS measurement result is included in an event triggered report.

An operation of the terminal according to a measurement/report request of the network may be performed in the form of a measurement report once. That is, if the network requests a CSI-RS measurement report and the terminal receives the request, the terminal transmits a report message including the CSI-RS measurement result. In this case, the terminal may directly report the CSI-RS measurement result, and may measure the CSI-RS resource during a maximum period capable of collection a measurement result, and may transmit the measurement result to the network.

If the terminal receives a request to include the CSI-RS measurement result upon a measurement report by receiving the above measurement configuration, the terminal may report as follows how to define relation between a report configuration with respect to the CSI-RS and the CSI-RS resource.

1) When the terminal generates a measurement report associated with the CSI-RS measurement report, the terminal may add all available CSI-RS measurement results in a measurement report.

2) When the terminal generates a measurement report associated with the CSI-RS measurement report, the terminal may include CSI-RS measurements of a specific CSI-RS resource set (set 1).

3) When the terminal generates a measurement report associated with the CSI-RS measurement report, the terminal may include CSI-RS measurements of a specific CSI-RS resource set (set 2).

4) When the terminal generates a measurement report associated with the CSI-RS measurement report, the terminal may include only CSI-RS measurement results of a threshold value of specific quality or greater. The network may previously set the threshold value of specific quality in the terminal.

The CSI-RS resource set 1 may be a CoMP set, and the CSI-RS resource set 2 may be a CRM set.

When the terminal performs the above embodiment, measurement and report relation operations of the terminal may be changed according to the measurement configuration set in the terminal. Hereinafter, the measurement configuration and a measuring and reporting method of the terminal based on the measurement configuration will be described in detail.

When the network performs the measurement configuration with respect to the terminal, the network may request to report the CSI-RS measurement result. A request for the CSI-RS measurement report may be implemented as follows.

1) The network may add the CSI-RS measurement result in a measurement report triggered due to a general RRM measurement result. In the request of type, the network may add a CSI-RS report indication in a measurement configuration for the RRM measurement and report (e.g. a report configuration with respect to RRM measurement report). When the terminal receives the above request, the terminal may add CSI-RS measurement results in a measurement report including RRM measurement results triggering the measurement report. That is, the CSI-RS measurement results may be piggback-delivered through the RRM measurement report.

When requesting the CSI-RS measurement report, the network may define relationship between the CRI-RS configurations and the CSI-RS resources to report the relationship to the terminal. Accordingly, the terminal may determine which a measurement result with respect to a CSI-RS resource and/or a corresponding resource is included in the measurement report.

2) The network may allow the terminal to report the CSI-RS measurement result independently from a measurement report triggered due to a general RRM measurement result. In this case, triggering of the CSI-RS measurement report is independent from triggering of the RRM measurement report. Accordingly, the CSI-RS measurement result may be transmitted to the network without triggering of the RRM measurement report. That is, the CSI-RS measurement results may be independently reported to the network.

When requesting the CSI-RS measurement report, the network may define relationship between the CRI-RS configurations and the CSI-RS resources to report the relationship to the terminal. Accordingly, the terminal may determine which a measurement result with respect to a CSI-RS resource should be evaluated with respect to the CSI-RS measurement report triggering condition.

When performing the CSI-RS measurement report, the terminal may be requested to include results (e.g. RRM measurement of all serving cells) with respect to all serving cells if possible.

An implementation of the measurement configuration will be described with reference the accompanying drawings in detail.

Figure 16:
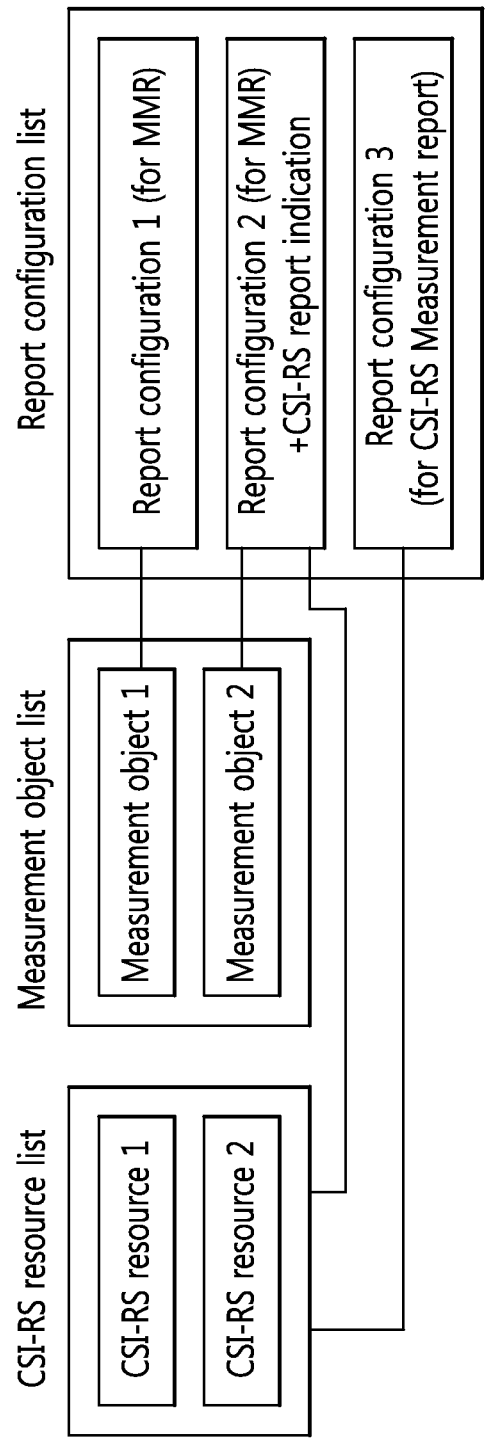
FIG. 16 is a diagram illustrating an example of a measurement configuration set in the terminal according to an embodiment of the present invention.

FIG. 16 is a diagram illustrating an example of a measurement configuration set in the terminal according to an embodiment of the present invention. A relationship between the CSI-RS resource and the report configuration is set in an example of a measurement configuration of FIG. 16.

A CSI-RS resource 1 and a CSI-RS resource 2 are allocated to the terminal as the CSI-RS resource. A measurement object 1 and a measurement object 2 are configured associated with the RRM measurement.

A report configuration 1, a report configuration 2, and a report configuration 3 are configured as a report configuration which is a reference of evaluation whether or not to report measurement of the terminal. The report configuration 1 includes a report reference of the RRM measurement result associated with a report of the RRM measurement result. The report configuration 2 is associated with reports of the RRM measurement result and the CSI-RS measurement result, and a report reference of the RRM measurement result. That is, the network may requests the CSI-RS measurement report to the terminal by adding a CSI-RS report indication to a report configuration 2 associated with the RRM measurement result report. The report configuration 3 is associated with a report of the CSI-RS measurement result, and includes a report reference of the CSI-RS measurement result.

The terminal may know relationship between the CSI-RS resource and the report configuration through the above measurement configuration. The terminal may evaluate whether not to report based on the relationship upon the RRM measurement result report and/or CSI-RS measurement report.

The terminal measures a measurement object associated with the report configuration 1. If the measurement result satisfies a report reference according to the report configuration 1, the terminal transmits a measurement report message. The measurement report message may include a corresponding measurement result.

The terminal measures a measurement object associated with the report configuration 2. If the measurement result satisfies a report reference according to the report configuration 2, the terminal transmits a measurement report message. The measurement report message may include an RRM measurement result obtained to triggering the measurement report message and a measurement result with respect to a CSI-RS resource (e.g. CSI-RS resources 1, 2) associated with the report configuration 2. In this case, the terminal may add CSI-RS IDs to identify CSI-RS resources 1 and 2 to the measurement report message.

The terminal measures the CSI-RS. If the CSI-RS measurement result satisfies a report reference according to the report configuration 3, the terminal transmits the measurement report message. The measurement report message may include a CSI-RS measurement result obtained by triggering the measurement report message. Meanwhile, when transmitting the triggered measurement report message according to the report configuration with respect to the CSI-RS, the terminal may be requested to add RRM measurement results with respect to all serving cells to the measurement report message. In this case, the terminal may add the RRM measurement results to the measurement report message.

Unlike the above measurement configuration, the network may include a EUTRA measurement report configuration information element (IE) as a part of the measurement configuration in order to configure the CSI-RS measurement report. Accordingly, CSI-RS resource identity information may be combined with a specific report configuration in a measurement configuration set in the terminal.

The identity is used to associate the report configuration with CSI-RS resource(s) being an object to be evaluated whether a report condition in a corresponding report configuration is satisfied or equivalent TP(s). If a CSI-RS resource indicated by the identity satisfies an associated report condition, the terminal may report a measurement result of a corresponding identity and the CSI-RS. In the present embodiment, the identity allows a function such as indication information requesting a CSI-RS measurement report of the above embodiment to be performed. That is, when a CSI-RS resource identity is included in each report configuration, the terminal may know that a measurement result with respect to the CSI-RS resource by the identity is an object of the CSI-RS measurement report.

The CSI-RS resource identity may indicate a specific CSI-RS, a specific CSI-RS resource set and/or all CSI-RS resources set to the terminal.

1) Case of Indicating the Specific CSI-RS Resource

In this case, if the indicated CSI-RS resource satisfies an associated report condition, the terminal triggers the CSI-RS measurement report. An identity of the CSI-RS resource satisfying a report condition through the CSI-RS measurement report and a measurement result of a corresponding CSI-RS resource are transmitted to the network.

2) Case of Indicating a Specific CSI-RS Resource Set (all CSI-RS Resources in a Corresponding CSI-RS Resource Set are Indicated)

In this case, when a certain CSI-RS resource of the indicated CSI-RS resource set satisfies an associated report condition, the terminal triggers the CSI-RS measurement report. An identity of the CSI-RS resource satisfying the report condition through the CSI-RS measurement report and a measurement result of a corresponding CSI-RS resource are transmitted to the network.

3) Case of Indicating all CSI-RS Resources

In this case, when a certain CSI-RS resource of the CSI-RS resources configured to the terminal satisfies an associated report condition, the terminal triggers the CSI-RS measurement report. An identity of the CSI-RS resource satisfying the report condition through the CSI-RS measurement report and a measurement result of a corresponding CSI-RS resource are transmitted to the network.

An implementation of the measurement configuration will be described with reference the accompanying drawings in detail.

Figure 17:
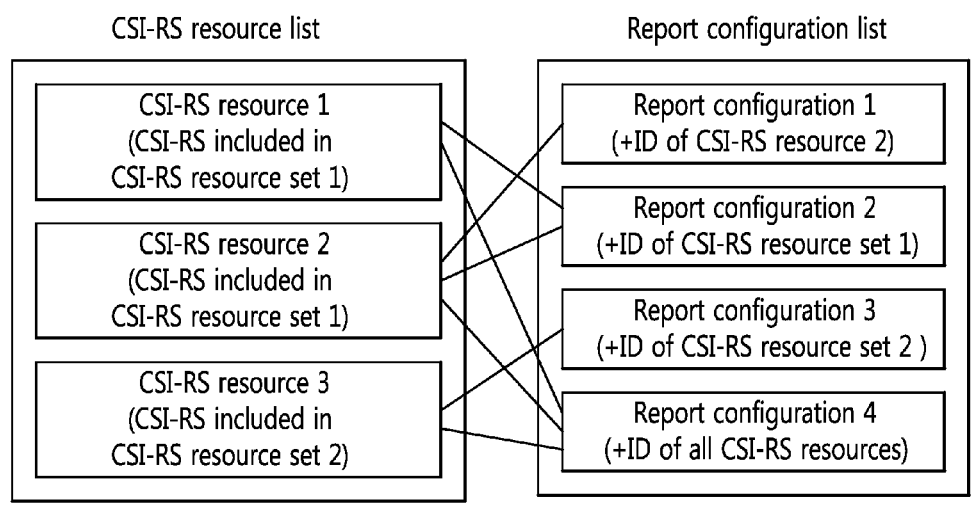
FIG. 17 is a diagram illustrating another example of a measurement configuration set in the terminal according to an embodiment of the present invention.

FIG. 17 is a diagram illustrating another example of a measurement configuration set in the terminal according to an embodiment of the present invention. A relationship between the CSI-RS resource and the report configuration through a CSI-RS resource identity is set in an example of a measurement configuration of FIG. 17.

A CSI-RS resource 1, a CSI-RS resource 2, and a CSI-RS resource 3 are allocated to the terminal as the CSI-RS resource. The CSI-RS resource 1 and the CSI-RS resource 2 are may be included in a CSI-RS resource set 1, and the CSI-RS resource 3 may be included in a CSI-RS resource set 2.

A report configuration 1 is combined with an ID of the CSI-RS resource 2 so that a report reference with respect to a measurement result of the CSI-RS resource 2 is provided. A report configuration 2 is combined with an ID of the CSI-RS resource 1 so that a report reference with respect to a measurement result of the CSI-RS resource 1 is provided. A report configuration 3 is combined with an ID of the CSI-RS resource 2 so that a report reference with respect to a measurement result of the CSI-RS resource 2 is provided. A report configuration 4 is combined with an ID of all CSI-RS resources so that a report reference with respect to a measurement result of all the CSI-RS resources is provided.

The terminal may know a relationship between a CSI-RS resource and the report configuration through the above set measurement configuration. The terminal may measure the CSI-RS resource to evaluate whether a measurement result satisfies a report reference set in a report configuration.

In an example of FIG. 17, with respect to the CSI-RS resource 1, the terminal may determine whether a measurement result of the CSI-RS resource 1 satisfies a report reference according to the report configuration 2 and/or the report configuration 4. With respect to the CSI-RS resource 2, the terminal may determine whether a measurement result of the CSI-RS resource 2 satisfies a report reference according to the report configuration 1, the report configuration 2 and/or the report configuration 4. With respect to the CSI-RS resource 3, the terminal may determine whether a measurement result of the CSI-RS resource 3 satisfies a report reference according to the report configuration 3 and/or the report configuration 4.

The terminal measures a specific CSI-RS resource. If the report reference according to the associated report configuration is satisfied, a measurement result of a corresponding CSI-RS resource and an ID of the CSI-RS resource are included in the measurement report message to be transmitted to the network.

In the above example, a CSI-RS resource set 1 may be a CoMP set, and a CSI-RS resource set 2 may be a CRM set.

According to the embodiment of the present invention with reference to FIGS. 15 to 17, the network may configure CSI-RS measurement/report in the terminal by extending the measurement configuration for the RRM measurement/report. The terminal may perform RRM measurement and/or CSI-RS measurement based on the measurement configuration to report the measurement results to the network. The network may provide a more improved coordinated communication service the terminal by configuring a more optimized CoMP operation in the terminal based on the reported CSI-RS measurement result.

Meanwhile, if handover is triggered to the terminal, the CSI-RS resource set and the CSI-RS measurement result may be forwarded to a target cell from a resource cell. The forwarding procedure may be performed through a handover preparation procedure.

The CSI-RS resource may be forwarded to the terminal during the handover as follows.

1) A specific CSI-RS resource set (set 1) among all CSI-RS resource sets configured in the terminal may be forwarded to the target cell from the resource cell during the handover.

2) A specific CSI-RS resource set (set 2) among all the CSI-RS resource sets configured in the terminal may be forwarded to the target cell from the resource cell during the handover.

3) The above CSI-RS resource sets (sets 1 and 2) configured in the terminal may be forwarded to the target cell from the resource cell during the handover. In this case, the resource cell enables the target cell to determine in which CSI-RS set each CSI-RS resource is included by grouping the CSI-RS resources (TPs) into two sets (CRM set and CoMP set). Alternatively, when forwarding each CSI-RS resource, the resource cell may include a flag to identify in which set a corresponding CSI-RS resource is included.

The CSI-RS measurement result acquired by the terminal during the handover may be forwarded as follows.

1) Measurement results with respect to a specific CSI-RS resource set (set 1) among all CSI-RS measurement results acquired by the terminal may be forwarded to the target cell from the resource cell during the handover.

2) Measurement results with respect to a specific CSI-RS resource set (set 2) among all the CSI-RS measurement results acquired by the terminal may be forwarded to the target cell from the resource cell during the handover.

3) All the CSI-RS measurement results acquired by the terminal may be forwarded to the target cell from the resource cell during the handover.

In this way, the target may suitably operate coordinated communication with respect to the terminal after the handover by forwarding the CSI-RS resource and the CSI-RS measurement result to the target cell during the handover.

The embodiment of the present invention provides a method of configuring CSI-RS measurement/report. According to the embodiment of the present invention, the network configures the CSI-RS measurement/report associated with a configuration with respect to the RRM measurement/report. Further, the network configures the CSI-RS measurement/report independently from the RRM measurement/report CSI-RS. The configuration of the measurement/report may be combined with configuration of the RRM measurement. In addition, the present invention configures the CSI-RS measurement/report by a network configuration scheme to be associated with a specific CSI-RS resource and/or a specific CSI-RS resource set. In this way, by combining the CSI-RS measurement report with the RRM measurement/report procedure, the network may efficiently acquire the CSI-RS measurement result measured by the terminal. This may provide a coordinated communication service having excellent quality to the terminal.

In addition, the present invention provides a scheme of forwarding a CSI-RS measurement configuration, a CSI-RS resource and/or a CSI-RS measurement result configured in the terminal to a target cell during a handover procedure. The target cell may configure the CSI-RS optimized in the terminal based on forwarded information. Accordingly, the terminal may receive a coordinated communication service having more improved quality.

Figure 18:
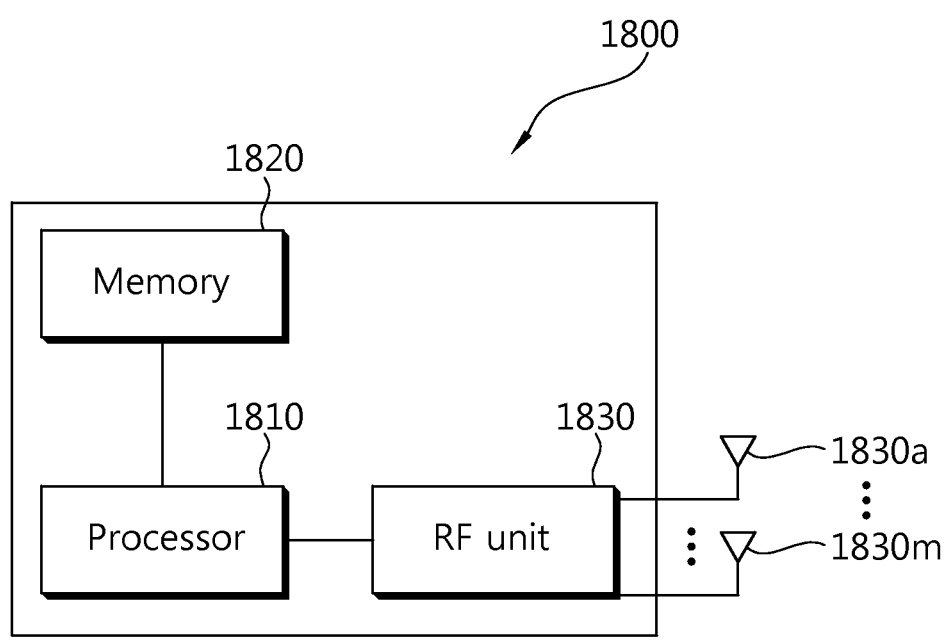
FIG. 18 is a block diagram illustrating a wireless apparatus according to an embodiment of the present invention.

FIG. 18 is a block diagram illustrating a wireless apparatus according to an embodiment of the present invention. The wireless apparatus may implement operation of a terminal and/or a network performing the above embodiment with reference to FIGS. 15 to 17.

The wireless apparatus 1800 includes a processor 1810, a memory 1820, and a radio frequency (RF) unit 1830. The processor 1810 performs the proposed functions, processes and/or methods. The processor 1810 may measure the RRM and/or the CSI-RS resource according to a measurement configuration. The processor 1810 may be configured to evaluate whether or not to report based on a report configuration associated with the CSI-RS resource, and to transmit the measurement report message to the network. The processor 1810 may be configured to forward the CSI-RS measurement result and/or the CSI-RS resource to the target cell during a reported handover. The processor 1810 may be configured to operate a CoMP in the terminal based on the acquired CSI-RS measurement result and/or the CSI-RS resource. The processor 1810 may be configured to set the CoMP operation in the terminal based on the reported measurement results. The processor 1810 may be configured to implement the embodiment of the present invention with reference to FIGS. 15 to 17.

The RF unit 1830 is connected to the processor 1810, and sends and receives radio signals. The RF unit 1830 may include a plurality of antennas 1830a to 1830m. Each antenna may be implemented to simultaneously transmit and receive to and from another wireless apparatus, a base station, and/or a TP.

The processor 1810 and the RF unit 1830 may be implemented to send and receive radio signals according to one or more communication standards. The RF unit 1830 may include one or more transceivers capable of sending and receiving radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for measuring a channel state information-reference signal (CSI-RS) and reporting a measurement result by a user equipment (UE) in a wireless communication system, the method comprising:

receiving, from a network, a Coordinated Multi-Point transmission and reception (CoMP) configuration including at least one of a CoMP measurement set (CoMP set) and a CoMP resource management (CRM) set;

acquiring, from the network, a radio resource monitoring (RRM) measurement configuration including a request of CSI-RS measurement report for CoMP, wherein the request of CSI-RS measurement report includes information on a predetermined number of CSI-RS measurement results in a measurement report, and a CSI-RS set identifier to indicate whether a measurement target CSI-RS set is the CoMP set or the CRM set;

performing a CSI-RS measurement for the CoMP set or the CRM set based on the request of CSIR-RS measurement report to acquire a plurality of CSI-RS measurement results;

evaluating whether or not a measurement result report condition has been satisfied based on the request of CSI-RS measurement report; and transmitting, to the network, a measurement report including the predetermined number of CSI-RS measurement results having a high quality among the plurality of CSI-RS measurement results when the measurement result report condition has been satisfied.

2. The method of claim 1, wherein the RRM measurement configuration comprises:
a report configuration to specify a measurement result report reference, and the request of CSI-RS measurement report is included in the report configuration.

3. The method of claim 2, further comprising:
acquiring an RRM measurement result by measuring the RRM based on the RRM measurement configuration,
wherein the evaluating whether or not the measurement result report condition has been satisfied comprises:
determining whether the RRM measurement result satisfies the measurement result report reference specified by the report configuration; and
determining that the measurement result report condition is satisfied when the measurement result report reference is satisfied,
wherein the measurement report comprises the RRM measurement result and the predetermined number of CSI-RS measurement results.

4. The method of claim 2, wherein the evaluating whether or not the measurement result report condition has been satisfied comprises:
determining whether the predetermined number of CSI-RS measurement results satisfies the measurement result report reference specified by the report configuration; and
determining that the measurement result report condition has been satisfied when the measurement result report reference is satisfied.

5. The method of claim 4, further comprising:
acquiring an RRM measurement result for a serving cell by performing the RRM measurement with respect to the serving cell,
wherein the measurement report further comprises the RRM measurement result for the serving cell.

6. The method of claim 2, wherein the request of CSI-RS measurement report comprises an identity to identify at least one CSI-RS resource.

7. The method of claim 6, wherein the evaluating whether or not the measurement result report condition has been satisfied comprises:
determining that the measurement result report condition has been satisfied when the predetermined number of CSI-RS measurement results correspond to at least one CSI-RS resource identified by the identity of the report configuration and the predetermined number of CSI-RS measurement results satisfy the measurement result report reference specified by the report configuration.

8. The method of claim 7, further comprising:
acquiring an RRM measurement result for a serving cell by performing the RRM measurement with respect to the serving cell,
wherein the measurement report further comprises the RRM measurement result for the serving cell.

9. The method of claim 1, wherein the measurement report further comprises a CSI-RS ID to identify a CSI-RS resource with respect to the CSI-RS measurement result.

10. The method of claim 9, wherein the predetermined number of CSI-RS measurements results and the CSI-RS resource are forwarded to a target cell when the UE handovers to the target cell.

11. A wireless apparatus operating in a wireless communication system, the wireless apparatus comprising:
a Radio Frequency (RF) unit configured to transmit and receive radio signals; and
a processor operably coupled to the RF unit,
wherein the processor is configured to:
receive, from a network, a Coordinated Multi-Point transmission and reception (CoMP) configuration including at least one of a CoMP measurement set (CoMP set) and a CoMP resource management (CRM) set,
acquire, from the network, a radio resource monitoring (RRM) measurement configuration including a request of CSI-RS measurement report for CoMP, wherein the request of CSI-RS measurement report includes information on a predetermined number of CSI-RS measurement results in a measurement report, and a CSI-RS set identifier to indicate whether a measurement target CSI-RS set is the CoMP set or the CRM set,
perform a CSI-RS measurement for the CoMP set or the CRM set based on the request of CSI-RS measurement report to acquire a plurality of CSI-RS measurement results,
evaluate whether or not a measurement result report condition has been satisfied based on the request of CSI-RS measurement report, and
transmit, to the network, a measurement report including the predetermined number of CSI-RS measurement results having a high quality among the plurality of CSI-RS measurement results when the measurement result report condition has been satisfied.

* * * * *